Patented Jan. 14, 1941

2,228,988

UNITED STATES PATENT OFFICE

2,228,988
WETTING, EMULSIFYING, AND DISPERSING AGENTS

Melvin De Groote, University City, and Bernhard Keiser and Charles M. Blair, Jr., Webster Groves, Mo., assignors, by mesne assignments, to Petrolite Corporation, Ltd., a corporation of Delaware No Drawing. Application April 28, 1938,
Serial No. 204,852

6 Claims. (Cl. 260—404)

This invention relates to new products adapted for use as wetting, dispersing or emulsifying agents. It relates more particularly to new ethers of partially esterified alkylolamines of the formula

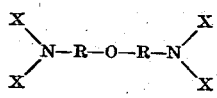

in which the R's represent alkyl, aralkyl or alicyclic groups, alike or different, and the X's represent alkyl, aralkyl, alicyclic, alkylol, hydroxyalicyclic, aralkylol or esterified alkylol, aralkylol or hydroxyalicyclic groups, alike or different. The various radicals may be indifferently selected, except that at least one of the radicals represented by X must contain an $R_4COO$ substituent ($R_4$ representing methyl or the carbon linked chain of a fatty acid). The invention includes not only these new products, but also a new process for their preparation. The new products are quite stable and are highly effective in acid solution.

The new ethers of the present invention are advantageously produced by simple condensation of the corresponding alkylolamines, in accordance with the equation:

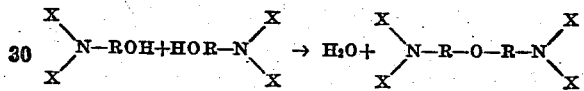

with elimination of water between an OH group of one molecule of the alkylolamine and an OH group of another molecule of the alkylolamine, with formation of an ether. Of course, if mixed alkylolamines are reacted, the product produced will contain various ethers. The reaction may be caused to take place by heating the amine to a temperature in excess of 100° C., advantageously above 150° C. but below the point of decomposition or volatilization of the constituents, for a relatively long period of time, for example, one or two days. If desired, a current of inert gas, such as dry nitrogen, may be passed through the reaction mixture to cause the reaction to proceed more rapidly.

The partially esterified alkylolamines used for the preparation of the new products of the present invention may be prepared in various ways. In general, they may be represented by the formula

in which $R_1$, $R_2$ and $R_3$ are alkyl groups as herein defined, or substituted alkyl groups, which may be the same or different, at least one of which has at least one $R_4COO$ substituent ($R_4$ representing methyl or the carbon linked chain of a fatty acid) and at least one of which has at least one OH (alcoholic hydroxyl) substituent, compounds having an $R_4COO$ substituent and an OH substituent in the same substituted alkyl group, with the other alkyl groups substituted or unsubstituted, being included. The new products may be prepared by heating such a partially esterified alkylolamine for the requisite time, or by heating a mixture of two or more partially esterified alkylolamines for the requisite time. The various new products may thus be produced, depending upon the starting materials, but in any case the new products will contain a substantial and predominating proportion of ethereal reaction products of the general formula shown above.

In this specification and the appended claims, the term "fatty acid" is used to designate broadly carboxylic acids of the aliphatic series, including both unsaturated and saturated acids as well as the substituted acids which may occur in natural fats or oils, such as ricinoleic acid, and modifications of the acids which occur in natural oils, such as those in blown or bodied oils; and the term "higher fatty acid" is used to designate those carboxylic acids, generally having at least eight carbon atoms, which occur combined with glycerin in natural oils and fats. It is understood that the term "alkylolamine" and "alkyl" are used conventionally in chemistry to refer to paraffin compounds which are non-cyclic and aliphatic in nature. We have found, however, that the alicyclic and hydroxyalicyclic, as well as the aralkyl and aralkylol amines are with respect to the reactions involved in the various phases of the present invention, similar to the corresponding alkyl and alkylol amines with the limitation that the aralkyl and aralkylol compounds have the linkage to the nitrogen atom in the side chain. For this reason, for the purpose of describing the present invention only, it is understood that the terms "alkyl" and "alkylol" include within their scope alicyclic, aralkyl, hydroxyalicyclic and aralkylol groups.

One advantageous method of preparing the partially esterified alkylolamines is that described in our application Serial No. 180,993, filed December 21, 1937, by reaction between a triglyceride of a fatty acid, or other ester of a fatty acid, and an alkylolamine having more than one alcoholic hydroxyl, the proportions of the ester and the alkylolamine being such that after the replacement of the glycerin or other alcohol of the fatty acid ester used, there will be at least one free alcoholic hydroxyl in the esterified alkylolamines. Such alkylolamines, having at least one esterified hydroxyl group and at least one free hydroxyl group, are herein referred to as "partially esterified alkylolamines." The free alcoholic hydroxyl of the partially esterified alkylolamine is available for condensation with a corresponding hydroxyl group of another molecule of the amine, or a corresponding hydroxyl group of another alkylolamine, to produce ethereal reaction products. However, the preparation of the partially esterified alkylolamines which may be used is not limited to the procedure described in said prior application, as they may also be prepared by suitable reaction between an acyl halide, such as an acyl chloride, and a tertiary alkylolamine, or in other ways. Also, it is to be understood that the alkylolamines used in accordance with the present invention need not be esters of tertiary alkylolamines with the higher fatty acids, but include tertiary alkylolamines partially esterified with the lower fatty acids, such as acetic acid, propionic acid, butyric acid, etc.

Among the amines which may be partially esterified for use in the production of the new products of the present invention are a wide range of tertiary alkylol and tertiary alkylalkylolamines. The two essentials are that the alkylolamine contain at least two alcoholic hydroxyl groups, which may be attached to the same or different carbon chains, and be a tertiary amine, that is, with three alkyl or alkylol groups linked to carbon atoms to the nitrogen atom.

Included among the suitable amines are triethanolamine, diethanolalkylamines, such as diethanolethylamine diethanolpropylamine, etc., tertiary glyceryl amines, such as tridihydroxypropylamine, dihydroxypropyldialkylamines, such as dihydroxypropyldiethylamine, di-dihydroxypropylalkylamines, diethanolmethylamine, tripropanolamine, dipropanolmethylamine, cyclohexanoldiethanolamine, di-cyclohexanolethylamine, etc. All such products may be readily prepared by known processes, and all of them are tertiary amines having at least two alcoholic hydroxyl groups, thus being adapted to form esters with higher fatty acids, such esters having at least one free hydroxyl group. Typical of the amines which may be used are the following:

(C₂H₄OH)₃N

Triethanolamine

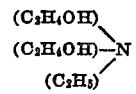

Diethanolethylamine

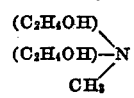

Diethanolmethylamine

[C₃H₅(OH)₂]₃N

Tri-dihydroxypropylamine (triglycerylamine)

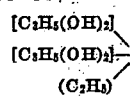

Di-dihydroxypropylethylamine (diglycerylethylamine)

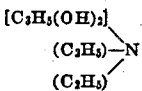

Dihydroxypropyldiethylamine (glyceryl diethylamine)

(C₃H₆OH)₃N

Tripropanolamine

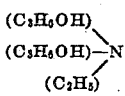

Dipropanolethylamine

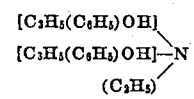

Di-phenylpropanolethylamine

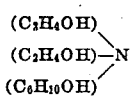

Cyclohexanoldiethanolamine

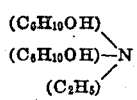

Dicyclohexanolethylamine (C₄H₈OH)₃N

Tributanolamine

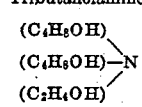

Dibutanolethanolamine

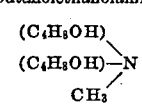

Dibutanolmethylamine

Any of these amines may be partially esterified with a suitable fatty acid or fatty acids, by the procedure described in our said application Serial No. 180,993, or by other methods. In the case of such alkylolamines as diethanolmethylamine, having but two alcoholic hydroxyl groups, the esterification should be such as to produce the mono-fatty acid ester. In the case of alkylolamines having three or more alcoholic hydroxyl groups, such as triethalonamine, triglycerylamine, etc., the esterification may be such as to produce mono-fatty acid esters, di-fatty acid esters, or even more highly esterified products, providing at least one free alcoholic hydroxyl remains available for condensation to form the new ethers. The fatty acids used for the esterification may either be the lower fatty acids, such as acetic acid, propionic acid, butyric acid, etc., or the higher fatty acids, such as occur naturally combined with glycerin as triglycerides, including those which occur combined with glycerin in such vegetable oils as cocoanut and palm-kernel oil, olive oil, castor oil, palm oil, peanut oil, the drying and semi-drying oils such as corn oil, rape-seed oil, soya bean oil, sunflower seed oil, linseed oil, perilla oil, etc., as well as the animal and marine oils, such as tallow, sardine oil, menhaden oil, etc., and the blown or bodied oils, such as blown castor oil, blown rapeseed oil or perilla oil, bodied linseed oil, etc. The fatty acids derived from blown or bodied oils have characteristics somewhat different from those derived from the original oils. The fatty acids from castor oil and blown castor oil produce products having somewhat special characteristics in view of the presence of oxygen in the long carbon-linked chain characteristic of castor oil fatty acids. In general, tertiary alkylolamines partially esterified with any of these fatty acids may be advantageously converted into ethers to form new ethereal products having important advantages as wetting, emulsifying and dispersing agents.

The invention will be further illustrated by the following specific examples, but it is not limited thereto.

Example 1.—Commercial triethanolamine and cocoanut oil, in the proportions of 1 mole of cocoanut oil to 3 moles of triethanolamine are heated to a temperature between about 150° C. and 180° C. for a period of about two days. If desired, a current of inert gas, such as dry nitrogen, may be passed through the reaction mixture to speed up the reaction. The resulting product consists mainly of the ether formed by the elimination of a molecule of water from two molecules of the mono-fatty acid ester of triethanolamine, with minor proportions of more complex ethers, ethers of the di-fatty acid ester of triethanolamine, ethers of the fatty acid esters of triethanolamine with glycerin or mono- or di-glycerides etc. The product has good wetting, emulsifying and detergent properties.

Example 2.—The di-ricinoleic acid ester of triglycerylamine is heated to a temperature between about 150° C. and 180° C. for about two days, with the production of a product consisting mainly of ethers such as di-dihydroxypropyl mono-hydroxypropylamine di-ricinoleate ether, and more complex ethers formed by the condensation of more than two molecules of the triglycerylamine di-ricinoleate, etc.

Example 3.—Diethanolethylamine monoacetate is heated to a temperature between about 150° C. and 180° C. for about two days with the production of a product consisting mainly of the ether of the formula:

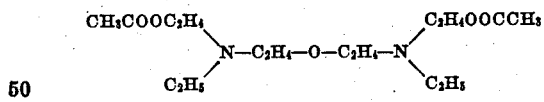

In place of the partially esterified alkylolamines referred to in the examples, other partially esterified alkylolamines, such as those derived by the partial esterification of the tertiary alkylolamines referred to above, may be used, with the production of corresponding ethers. The new ethers include the more or less simple ethers formed by the condensation of two molecules of the partially esterified alkylolamines, and more complex ethereal derivatives which may be formed by the condensation of more than two molecules of the partially esterified alkylolamines together. The invention also includes the ethereal reaction products produced by heating a partially esterified alkylolamine with other tertiary alkylolamines, including other partially esterified tertiary alkylolamines or simple tertiary alkylolamines, whether having but one hydroxy group or more than one hydroxy group, as illustrated in the following example.

Example 4.—The mono-fatty acid ester of triethanolamine obtained by heating triethanolamine with cocoanut oil, as described in our application Serial No. 180,993, is heated with diethylethanolamine for about two days at a temperature of from 150° C. to 180° C., with elimination of water and condensation to form triethylamine ethyldiethanolamine stearate ether.

The new ethereal products of the present invention may also be prepared by other processes involving the reaction of the starting materials in a different order. For example, ethers may be prepared by heating a suitable alkylolamine or mixture of alkylolamines at a temperature sufficiently high to bring about ether formation for a period sufficient to bring about etherification without removal of all of the alcoholic hydroxyl groups. The resulting ethers, having free hydroxyl groups, may then be reacted with a fatty acid, fatty oil, acyl halide, or the like to produce esterified or partially esterified di-alkylolaminoalkyl ethers, or more complex ethers. This procedure is illustrated by the following example.

Example 5.—Four moles of commercial triethanolamine are heated to a temperature of between about 180° C. and 200° C. for several hours, or until about 2 moles of water have been evolved from the mixture. If desired, a small amount of a dehydration catalyst, such as sodium hydroxide, sodium carbonate, etc., may be added to the reaction mass to increase the rate of reaction. The product contains a substantial proportion of the ether of the formula:

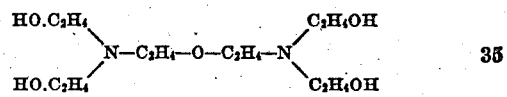

One mole of commercial cocoanut oil is then added to the above reaction mass, and heating is continued at a temperature between about 110° C. and 150° C. for three or four hours. The resulting final product is similar to that obtained by the process of Example 1.

We claim:
1. The process of preparing products adapted for use as wetting, emulsifying and dispersing agents, which comprises heating a tertiary alkylolamine partially esterified with a fatty acid with a tertiary alkylolamine to a temperature in excess of 100° C. for a period of time sufficient to effect condensation with the production of a reaction product having an ether linkage.
2. The process of preparing products adapted for use as wetting, emulsifying and dispersing agents, which comprises heating a tertiary alkylolamine partially esterified with a fatty acid to a temperature in excess of 100° C. for a period of time sufficient to effect condensation with the production of a reaction product having an ether linkage.
3. The process as in claim 1 in which a current of inert gas is passed through the reaction mixture.
4. Compounds of the formula

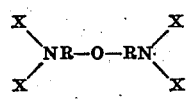

in which the R's represents alkyl groups and the X's represent alkyl groups, at least one of which contains an R₁COO substituent, R₁ representing a radical of the class consisting of methyl and the carbon linked chains of fatty acids.

5. Compounds of the formula

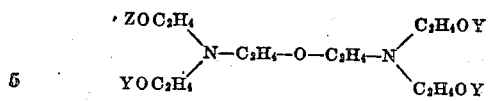

in which Y represents radicals indifferently selected from the class consisting of hydrogen and aliphatic carboxylic acyl radicals and Z represents an aliphatic carboxylic acyl group.

6. Compounds of the formula

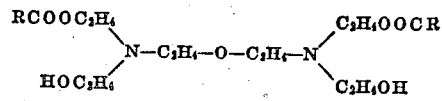

in which R represents the long carbon linked chain characteristic of the higher fatty acids.

MELVIN DE GROOTE.
BERNHARD KEISER.
CHARLES M. BLAIR, Jr.